United States Patent [19]
Erler

[11] 3,806,787
[45] Apr. 23, 1974

[54] CIRCUIT FOR GENERATING A VOLTAGE PROPORTIONAL TO MOTOR ARMATURE CURRENT

[75] Inventor: Irvin L. Erler, Waynesboro, Va.

[73] Assignee: General Electric Company, Lynn, Mass.

[22] Filed: Aug. 20, 1973

[21] Appl. No.: 389,557

[52] U.S. Cl. .................. 318/599, 318/341, 318/678
[51] Int. Cl. ............................................. G05b 9/02
[58] Field of Search .................... 318/599, 678, 341

[56] References Cited
UNITED STATES PATENTS

| | | | |
|---|---|---|---|
| 3,260,912 | 7/1966 | Gregory | 318/678 X |
| 3,427,506 | 2/1969 | Thiele | 318/341 X |
| 3,525,029 | 8/1970 | Joslyn et al. | 318/599 |
| 3,652,913 | 3/1972 | Leland | 318/678 |

*Primary Examiner*—B. Dobeck

[57] ABSTRACT

A circuit for generating a voltage proportional to the armature current of a motor driven from a pulse width modulated power switching amplifier. A very small resistor is placed in series with the load in order to develop a voltage that is proportional to the load current. A voltage divider is placed across the series resistor. The emitter of a first transistor is connected to one end of the series resistor through an emitter resistor and the emitter of a second transistor is connected to the other end of the series resistor through an emitter resistor. The bases of the two transistors are connected to each other and to the tap of the voltage divider through a constant voltage source so that both transistors are conductive over the full range of load current. The collector voltage of the first transistor is determined by the voltage at the one end of the series resistor and the emitter voltage of the first transistor. Similarly, the collector voltage of the second transistor is determined by the voltage at the other end of the series resistor and the emitter voltage of the second transistor. The two collector voltages are applied to a difference amplifier that provides a voltage that is proportional to the load current and is referenced to a single potential.

4 Claims, 1 Drawing Figure

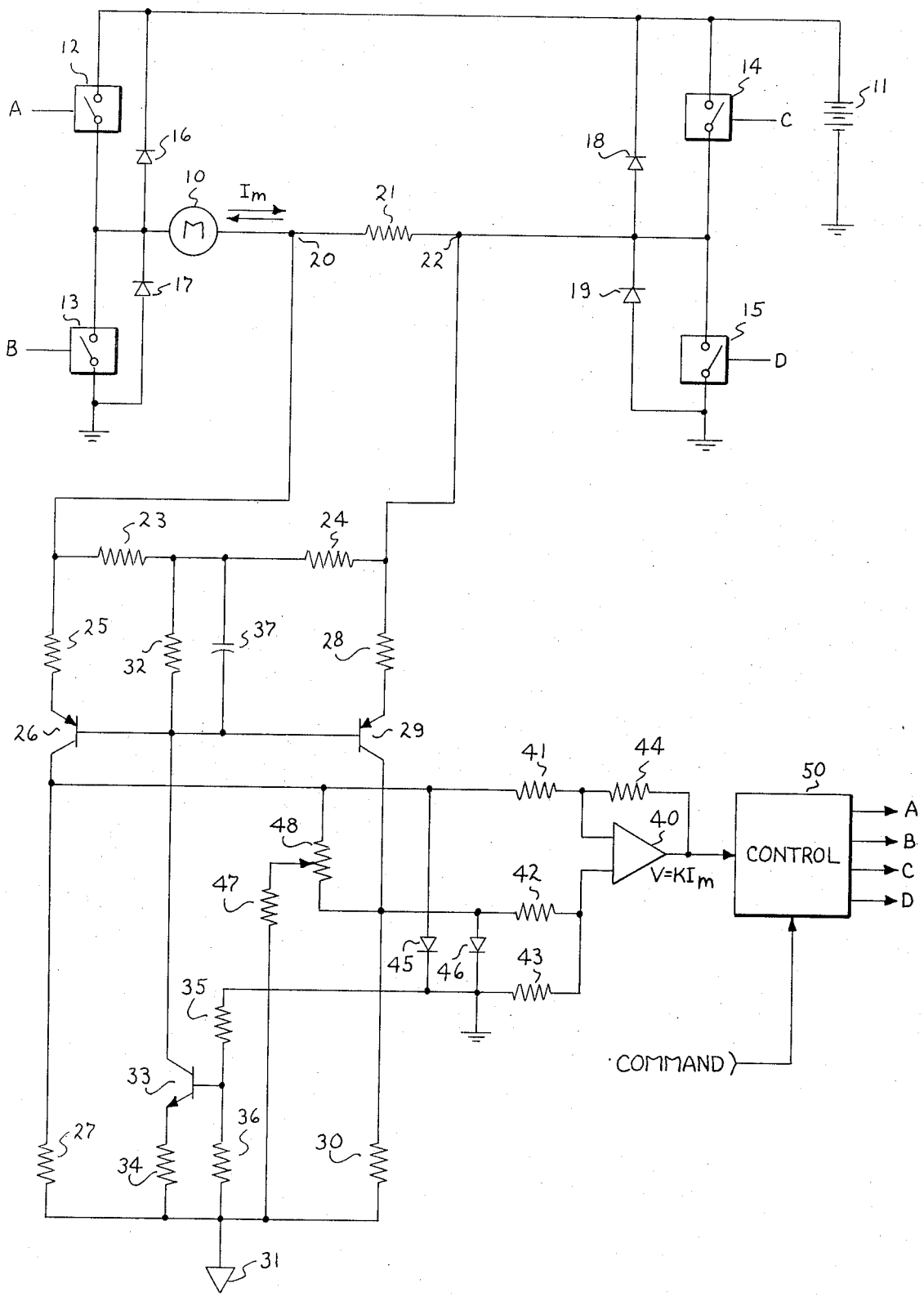

CIRCUIT FOR GENERATING A VOLTAGE PROPORTIONAL TO MOTOR ARMATURE CURRENT

RELATED APPLICATION

This application is related to application Ser. No. 405,936, entitled "Pulse Width Modulated Servo System" by Lawrence S. McNaughton et al., filed Oct. 12, 1973 and assigned to the same assignee as this application.

BACKGROUND OF THE INVENTION

This invention relates to an improved circuit for generating a voltage that is proportional to the armature current of a motor driven from a pulse width modulated power switching servo amplifier.

One type of pulse width modulated power switching servo amplifier, as disclosed in U.S. Pat. No. 3,525,029, issued to John A. Joslyn et al. and assigned to the General Electric Company, uses four switches connected to form a bridge. The motor, or load, is connected across one diagonal of the bridge and a d-c power supply is connected across the other diagonal of the bridge. If one pair of diagonally opposed switches is made conductive while the other pair of diagonally opposed switches is made non-conductive, the d-c power supply will drive current through the load in one direction. If the other pair of diagonally opposed switches is made conductive while the one pair of diagonally opposed switches is made non-conductive current will be driven through the load in the opposite direction. By controlling the conducting intervals of the pairs of diagonally opposed switching elements, current flow through the load can be proportionally controlled.

In certain applications of pulse width modulated controlled motors, it is necessary to generate a voltage having a polarity determined by the direction of current flow through the motor and having a magnitude proportional to the magnitude of the motor current. This can be accomplished by placing a resistor in series with the motor and sensing the voltage developed across the resistor due to the motor current flowing through the resistor. But since the switches that form the elements of the bridge reverse the polarity of the power supply across the combination of the motor and series resistor, the voltage developed across the series resistor will be referenced to either the negative terminal or the positive terminal of the power supply, depending upon the direction of current flow through the motor. The circuits that use the voltage representative of the motor armature current generally require a signal that is always referenced from a single potential such as ground. The circuit of this invention is connected across the resistor in series with the motor and generates a voltage, referenced to ground, that is directly proportional to the motor current.

One prior art circuit for generating a signal that is proportional to the current of a motor driven from a pulse width modulated power switching servo amplifier is disclosed in U.S. Pat. No. 3,582,750, issued to Martin O. Halfhill. In Halfhill the motor current flows through a resistor in series with the motor. The voltage developed by the series resistor is applied to the base-emitter junction of each of 2 transistors. Depending on the direction of current flow through the motor, one of the two transistors will be made conductive and a current that is a function of the motor current will flow through the collector of the conducting transistor. One disadvantage of the circuit disclosed by Halfhill is that when silicon transistors are used the voltage across the resistor in series with the motor must be in the range of 0.7 volts before the appropriate transistor will become conductive. Thus, in order to detect a minimum motor current of one ampere, the series resistor will have to be 0.7 ohms. In order to detect lower values of motor current, the series resistor will have to be proportionally increased. Of course, increasing the value of the series resistor increases the amount of power dissipated in the series resistor which can be quite sizeable as the peak currents of the motors involved can be anywhere from 10 to 40 amperes. In the circuit of this invention the series resistor is maintained at a very low value, such as 0.05 ohms, to minimize power dissipation and the transistor circuits that measure the motor current are biased so that they can make the measurement over the full range of motor currents.

Another prior art circuit for generating a voltage that is proportional to the motor current is disclosed in the aforementioned Joslyn et al. patent. Joslyn et al. places a resistor in series with the switch in two adjacent legs of the bridge. One end of each resistor is connected to the same terminal of the d-c voltage source for the motor thereby providing a common reference potential for the voltage developed across each resistor. Depending upon the desired direction of current flow in the motor, one of the switches will be closed and the motor current will flow through the resistor in series with the closed switch to develop a voltage proportional to the motor current. One disadvantage of this approach is that additional circuitry is necessary for amplifying the voltage across each resistor and then selecting the amplifier associated with the resistor in series with the closed switch.

Pulse width modulated motor control circuits quite often operate in an industrial environment in which the circuitry is subjected to a wide range of operating temperatures and in which electrical noise and power supply variations can occur which affect the accuracy and linearity of the motor current measuring circuit. In the circuit of this invention, difference techniques are utilized which minimize the error due to electrical noise, power supply variation, and changes in transistor characeristics due to temperature.

It is a primary object of this invention to provide an improved circuit that will generate a voltage with respect to a single reference potential that is proportional to the current in a load driven from a pulse width modulated power switching amplifier.

Another object of this invention is to provide an improved circuit utilizing a single, relatively small, as compared to the prior art, resistor in series with the load for generating a voltage proportional to the load current when the load is driven from a pulse width modulated power switching amplifier.

Yet another object of this invention is to provide a circuit that generates a voltage that is proportional to the load current and which is less susceptible to electrical noise when the load is driven from a pulse width modulated power switching amplifier.

Another object of this invention is to provide an improved circuit for generating a voltage that is proportional to the current through a load driven from a pulse width modulated power switching amplifier and which includes compensation for variations in the power supply voltage and in the characteristics of the transistors due to changes in temperature.

SUMMARY OF THE INVENTION

In accordance with this invention a very small resistor is placed in series with the load in order to develop a voltage that is proportional to the load current. A voltage divider is placed across the series resistor. A first transistor has its emitter connected to one end of the series resistor through an emitter resistor and a second transistor has its emitter connected to the other end of the series resistor through an emitter resistor. The bases of the two transistors are connected to each other and the two bases are connected to the tap of the voltage divider through a constant voltage source so that both transistors are conductive over the full range of load current. The collector current, and hence the collector voltage of the first transistor relative to a reference potential, is determined by the voltage across the emitter resistor of the first transistor. Similarly, the collector current, and hence the collector voltage of the second transistor circuit relative to the reference potential, is determined by the voltage across the emitter resistor of the second transistor. The two collector voltages are applied to a difference amplifier and since the two transistors have substantially equal emitter voltages, the output of the difference amplifier is a voltage that is proportional to the voltage across the series resistor, or in other words is proportional to the load current and is referenced to a single potential.

DESCRIPTION OF THE DRAWINGS

While the specification concludes with claims particularly pointing out and claiming that which is regarded as the present invention, the objects and advantages of this invention cna be more readily ascertained from the following description of a preferred embodiment when read in conjunction with the accompanying drawing which is a schematic diagram of the current measuring circuit of this invention.

DETAILED DESCRIPTION

In the accompanying FIGURE. switches 12, 13, 14 and 15 are connected in series to form a bridge. The circuit consisting of the motor 10 and series resistor 21 is connected across one diagonal of the bridge and a d-c voltage source 11 is connected across the other diagonal of the bridge. Diodes 16, 17, 18 and 19 are connected in parallel with switches 12, 13, 14 and 15, respectively, and provide alternate conductive paths for the motor armature current. When switches 12 and 15 are closed and switches 13 and 14 are open, the d-c voltage source 11 will supply current, $I_m$, through switch 12 through the motor from left to right and through series resistor 21 and closed switch 15. When it is desired to drive the motor 10 in the opposite direction, switches 12 and 15 will be open and switches 13 and 14 will be closed and d-c voltage source 11 drives current, $I_m$, through closed switch 14 and then through series resistor 21, through the motor 10 from right to left, and then through switch 13. Thus, it can be seen that when current is being supplied to the motor by closing switches 12 and 15 the voltage developed across the series resistor 21 is referenced to ground through closed switch 15 and when current is being supplied to the motor by closing switches 13 and 14 the voltage developed across the resistor 21 is referenced to the positive terminal of the d-c voltage source 11. Control of the motor is provided by control block 50 which generates the signals A, B, C and D that operate switches 12, 13, 14 and 15, respectively. The primary input to control block 50 is a command signal. In certain applications a signal referenced to ground that is proportional to the motor current is also applied to the control block 50. The detailed design of control block 50 is not shown as it is not relevant to the current measuring circuit of this invention.

The current measuring circuit of this invention includes a voltage divider consisting of resistors 23 and 24 connected across the series resistor 21. A first transistor 26 has its emitter connected to one end 20 of the series resistor 21 through an emitter resistor 25, and its collector is connected to a d-c voltage source 31 through collector resistor 27. In a similar manner a second transistor 29 has its emitter connected to the other end 22 of series resistor 21 through emitter resistor 28 and has its collector connected to the d-c voltage source 31 through collector resistor 30. The base of transistor 26 is connected to the base of transistor 29. The parallel combination of resistor 32 and capacitor 37 is connected between bases of transistors 26 and 29 and the tap of the voltage divider consisting of resistors 23 and 24. The bases of transistors 26 and 29 are also connected to a constant current source consisting of transistor 33 and resistors 34, 35 and 36. The collector of the first transistor 26 is connected to one input of a difference amplifier 40 through input resistor 41. The collector of the second transistor 29 is connected to the other input of difference amplifier 40 through input resistor 42. Resistors 43 and 44 determine the gain of difference amplifier 40 and reference the output voltage to ground. Diodes 45 and 46 clamp the collectors of transistors 26 and 29 to ground and thereby prevent a large positive voltage from being applied to either input of difference amplifier 40. Potentiometer 48 is connected between the collector of transistor 26 and the collector of transistor 29. The arm of the potentiometer is connected to the d-c power source 31 through resistor 47. Potentiometer 48 and resistor 47 are used to adjust for zero output of amplifier 40 when there is zero armature current.

The operation of the circuit will now be described. The voltage divider consisting of resistors 23 and 24 provides at the tap a single reference voltage that has a magnitude related to the voltage appearing at either end 20 or 22 of series resistor 21. In other words, when the motor current, $I_m$, is flowing from left to right through the motor 10, the voltage at the tap of the voltage divider will be within a volt or so of ground and when current, $I_m$, is flowing from right to left through the motor 10, the voltage at the tap of the voltage divider will be within a volt or so of the d-c voltage source 11.

Resistors 35 and 36 form a voltage divider between ground and the minus d-c voltage source 31 to establish a constant voltage at the base of transistor 33. Since the voltage drop across the base-emitter junction of transistor 33 is also a constant, a fixed voltage appears across the emitter resistor 34 thereby establishing a constant current flow through transistor 33 and resistor 32. This constant current flow through resistor 32 establishes a constant voltage drop across resistor 32 thereby establishing a biasing voltage for transistors 26 and 29. The biasing voltage is selected so that transistors 26 and 29 are conductive over the full range of motor current.

Since the voltage at the base of transistor 26 is equal to the voltage at the base of transistor 29, and since the base-to-emitter voltage drop of transistor 26 will be for all practical purposes equal to the base-to-emitter voltage drop of transistor 29, the voltage at the emitter of transistor 26 will be equal to the voltage at the emitter of transistor 29. The current flowing through the emitter of transistor 26 will be determined by the difference between the voltage at end 20 of series resistor 21 and the voltage at the emitter of transistor 26. This emitter current will flow through the collector resistor 27 to develop a voltage at the collector of transistor 26 that is referenced to the minus d-c voltage source 31 and which is proportional to the difference between the voltage at end 20 of series resistor 21 and the voltage at the emitter of transistor 26. In a similar manner, the emitter current that flows through transistor 29 will be determined by the difference between the voltage at end 22 of series resistor 21 and the voltage at the emitter of transistor 29. The emitter current of transistor 29 flows through the collector resistor 30 to develop a voltage at the collector of transistor 29 that is also referenced to the minus d-c voltage source 31 and which is proportional to the difference between the voltage at end 22 of series resistor 21 and the voltage at the emitter of transistor 29. Since difference amplifier 40 is forming the difference between the voltage at the collector of transistor 26 and the voltage at the collector of transistor 29 and since the voltage at the emitter of transistor 26 equals the voltage at the emitter of transistor 29, the output of the difference amplifier 40 will only be a function of the difference between the voltage at end 20 and the voltage at end 22 of the series resistor 21. And since the voltage across the series resistor 21 is for all practical purposes proportional to the motor current, the output of the difference amplifier 40 is proportional to the motor current.

One preferred embodiment of this circuit, as hereinafter disclosed, uses a series resistor 21 having a value of 0.05 ohms and yet generates a voltage that is proportional to the current flowing through the motor 10 over the full range of motor current.

The current sensing circuit of this invention is independent of the reference for series resistor 21, that is to say, the circuit does not depend on whether current is being driven from right to left through motor 10 as when switch 14 is closed and end 22 of series resistor 21 is referenced to the positive terminal of the voltage source 11 or whether current is being driven from left to right through the motor 10 as when switch 15 is closed and end 22 of series resistor 21 is referenced to ground.

Another feature of the circuit of this invention is that any noise appearing at end 20 of series resistor 21 will also appear at end 22 of series resistor 21 and will eventually be cancelled out by the difference amplifier 40.

Another benefit of the circuit of this invention is that since the same transistor type is used for transistor 26 and transistor 29 it can be expected that the characteristics of the transistors will change in the same amount in responses to changes in the environment. To the extent that the changes in the characteristics of transistors 26 and 29 result in similar changes of the voltage appearing at the collectors of transistors 26 and 29, these will be cancelled in difference amplifier 40.

Another advantage of this current measuring circuit is that variations in the voltage of d-c voltage source 31 are also cancelled out by difference amplifier 40.

Component values which operate with one embodiment of the current measuring circuit herein described are as follows:

21 Resistor — 0.05 ohms
23 Resistor — 47 ohms
24 Resistor — 47 ohms
25 Resistor — 3.57K ohms
26 Transistor — Motorola Numer MM4001
27 Resistor — 4.64K ohms
28 Resistor — 3.57K ohms
29 Transistor — Motorola Number MM4001
30 Resistor — 4.64K ohms
32 Resistor — 806 ohms
33 Transistor — GE Number D44R2
34 Resistor — 806 ohms
35 Resistor — 2.32K ohms
36 Resistor — 1.0K ohms
37 Capacitor — 0,047 Microfarads
40 Difference Amplifier — 741
41 Resistor — 20K ohms
42 Resistor — 20K ohms
43 Resistor — 121K ohms
44 Resistor — 121K ohms
45 Diode — 1N4444
46 Diode — 1N4444
47 Resistor — 22K ohms
48 Potentiometer — 50K ohms While the present invention has been described with reference to a specific embodiment thereof it will be obvious to those skilled in the art that various changes and modifications may be made without departing from the invention in its broader aspects.

It is contemplated in the appended claims to cover all variations and modifications of the invention which come within the true spirit and scope of the invention.

What is claimed as new and desired to be secured by Letters Patent of the United States is:

1. In a pulse width modulation switching power amplifier having four switching means connected in bridge fashion with a load and a d-c voltage source for coupling the load across alternate output terminals of the d-c voltage source in accordance with the polarity and magnitude of an input control signal, an improved circuit for generating a voltage that is proportional to the load current comprising:
   a. a resistor in series with the load for generating a voltage proportional to the load current;
   b. circuit means responsive to the voltage across the resistor for generating a first voltage that is a function of the voltage at one end of the series resistor and a second voltage that is a function of the voltage at the other end of the series resistor; and
   c. a difference amplifier responsive to the first and second voltages for generating a voltage proportional to the load current.

2. An improved circuit as recited in claim 1 wherein the circuit means includes a first transistor responsive to the voltage at one end of the series resistor and a second transistor responsive to the voltage at the other end of the series resistor and bias circuit means for maintaining said first and second transistors conductive over the full range of load current.

3. In a pulse width modulation switching power amplifier having four switching means connected in bridge fashion with a load and a d-c voltage source for coupling the load across alternate output terminals of the d-c voltage source in accordance with the polarity and magnitude of an input control signal, an improved circuit for generating a voltage that is proportional to the load current comprising:
   a. a resistor in series with the load for generating a voltage proportional to the load current;
   b. a voltage divider connected across the series resistor;
   c. a d-c voltage source connected to the voltage divider tap for generatng a bias voltage related to the voltage at the tap;
   d. first circuit means responsive to the voltage at one end of the series resistor and to the bias voltage for generating a first voltage that is a function of the voltage at one end of the series resistor;
   e. second circuit means responsive to the voltage at the other end of the series resistor and to the bias voltage for generating a second voltage that is a function of the voltage at the other end of the series resistor; and
   f. a difference amplifier responsive to the first and second voltages for generating a voltage proportional to the load current.

4. An improved circuit as recited in claim 3 wherein the first circuit means includes a transistor having an emitter circuit connected to the voltage at the one end of the series resistor ahd having a base connected to the bias voltage, said first voltage being generated in the collector circuit of the first circuit means transistor; and wherein the second circuit means includes a transistor having an emitter circuit connected to the voltage at the other end of the series resistor ane having a base connected to the bias voltage, said secone voltage being generated in the collector circuit of the second circuit means transistor.

* * * * *